Patented June 20, 1939

2,163,207

UNITED STATES PATENT OFFICE 2,163,207

METHOD FOR THE MANUFACTURE OF POROUS BUILDING MATERIAL

Simon Missotten, Brussels, Belgium

No Drawing. Application February 20, 1937, Serial No. 126,942. In Belgium February 26, 1936

5 Claims. (Cl. 106—24)

The present invention relates to a process for the manufacture of building materials having a cellular or porous structure and particularly to a process for the manufacture of materials with a base of airy or hydraulic binding agent such as concrete, mortar, plaster or the like, in the mass of which cells, bubbles, interstices, pores or empty spaces are produced by a liberation of gas during the setting of the binding agent.

It has been proposed to make porous mortar or concrete by adding metals in powdered form, such as aluminum and zinc, in the presence of water to the primary materials employed, before setting.

It has also been proposed for the same purpose to add to these primary materials compounds containing chemically active oxygen and to produce the liberation of gas during the setting by a decomposing catalyzer, such as metallic powders or compounds, for instance manganese dioxide.

These different methods, at present known, present in practice several disadvantages. Thus, for example, the known methods give rise to reactions which are too slow or result in irregular and unequal distribution of the pores or produce slow and irregular hardening. On the other hand, these methods have for their sole purpose the formation of pores or bubbles due to the liberation of oxygen, and all compounds added only serve to favourably influence this liberation of oxygen and provide for an equal distribution of the same in the mass of material. The materials obtained by these methods have a structure which is insufficiently homogeneous, have a feeble and irregular consistency, and have an insufficient and inconstant strength often diminishing with time or under the action of foreign or climaterical agents. Further these methods present the disadvantage of being very costly.

The object of the present invention is a method of manufacture which will overcome the disadvantages of the processes known hitherto and permit the formation of very light materials having a porous or cellular structure, perfectly homogeneous, offering a greater and uniform strength and having a regular and normal hardening.

For this purpose according to the invention the mass of primary materials used for the manufacture of concrete is subjected to chemical reactions and physical actions, each one of which performs a predetermined function and all of which jointly insure the desired qualities for the materials obtained.

For this purpose according to the invention, there is incorporated with this mass chemical compounds capable of producing the three following effects:

(1) A production of gas favourable to the formation of cells in the mass of concrete during the setting;

(2) A formation of active gases the particular properties of which render them capable of acting on certain components of the material in order to ensure the uniform hardening of the material and the formation of substances which are favourable for the strength of the same.

(3) A slow and progressive liberation of gas which insures a uniform and regular porosity and a homogeneous structure of the mass, and which from the chemical point of view, is favourable for the regularity of the action of said gases on said components.

The principal effect (as enumerated under effect No. 2 above) serves to fix the free lime, which, as known, is always contained in all materials with a base of lime and which exercises a disadvantageous influence upon the qualities of the material to be obtained. If the lime, on the contrary, is fixed, the material obtained has a greater strength.

For the purpose mentioned according to the invention, there is added to the primary materials employed chemical compounds capable of forming by their reactions gases producing the above mentioned effects, each of these compounds or gases acting according to its particular properties on one or other of the constituents of the material.

During the setting of the concrete, according to one embodiment of the present invention the following gases are formed:

(a) Chlorine (Cl), which gas tends to form cells and acts on the free lime (CaO) in order to form calcium chloride ($CaCl_2$) favourable to the hardening, and on the ammonia ($NH_3$) in order to form ammonium chloride ($NH_4Cl$) so as to operate as antichlore;

(b) Oxygen (O), which assists the formation of cells;

(c) Ammonia ($NH_3$), which gas itself also assists the formation of cells and, moreover, act on chlorine and hydrochloric acid in order to form ammonium chloride ($NH_4Cl$), the vapour of which is favourable to the production of cells;

(d) Nitrogen (N), which also contributes to the formation of cells in the material;

(e) Carbon dioxide ($CO_2$), which assists the formation of cells and further forms, with the free lime, limestone ($CaCO_3$) which is favourable for the hardening and the strength of the material obtained.

The fact that the above mentioned gases, which are soluble to different extents in the mixing water, are liberated in a uniform and progressive manner in proportion to the hydration of the binding agents presents the advantage of ensuring the uniform distribution of the cells and uniform reactions of the gases whereby a substantially homogeneous hardening and strength of material are obtained.

In order to produce the above mentioned gases according to the preferred embodiment of the invention, use is made of limestone ($CaCO_3$), ammonia ($NH_3$) and hypochlorites, such as alkali metal hypochlorites or hypochlorites of alkaline earth metals added to the primary materials used.

Due to their chemical reactions, these different components produce, with liberated hydrochloric acid, quantities of chlorine (Cl), ammonium chloride ($NH_4Cl$), nitrogen (N), oxygen (O) and carbon dioxide ($CO_2$).

All these gases exercise a very favourable action on the formation of cells, but the principal of them, such as carbon dioxide ($CO_2$) and chlorine (Cl), when liberated, act moreover on the free lime of the binding agents whereby calcium salts, such as ($CaCO_3$) and ($CaCl_2$), are formed, which are very favourable for the hardening and the strength of the material to be obtained.

In order to enable said reactions to be activated, it is advantageous to add to the components during the mixing thereof, a small quantity of a compound, such as hydrogen peroxide or oxygenated water ($H_2O_2$), which assists the before mentioned reactions by reason of the heat liberated during the decomposition of said compound.

On account of their characteristic actions and their reciprocal reactions, said different compounds produce a quantity of active gas necessary in order to form in the mass of the still plastic material, cells, empty spaces or pores uniformly distributed throughout the mass of the product.

According to the invention, the expansion of the mass during setting may be adjusted by varying the volume of gases liberated and the speed of their liberation by modifying the proportion of chemical compounds used.

Furthermore, to the mixture of primary materials and above mentioned ingredients may be added inert or active substances giving to the mass, properties of heat insulation, resistance to fire, acoustic insulation and a resistance to external agents.

In order to adjust the cells, use may similarly be made of the addition of a small percentage of a protective colloid, such as ossein, albumen, animal glue, gelatine, saponin, mineral colloids, bentonite, greasy clay, colloidal earths or the like.

It will be obvious that the proportions of the ingredients and of the chemical compounds incorporated may vary according to the properties of materials to be obtained.

The composition given below, for example, permits a concrete to be obtained having an apparent density of 0.6.

| | | |
|---|---|---|
| Cement | kilograms | 44,000 |
| Sand | do | 10,000 |
| Limestone | do | 0,800 |
| Chloride of lime | do | 2,500 |
| Sodium hypochlorite | litres | 0,500 |
| Ammonia | do | 0,650 |
| Oxygenated water ($H_2O_2$) | do | 0,175 |
| Ossein | do | 0,075 |

It will be obvious that the above numerical values are given only by way of non-limitative example and that only one chloride or hypochlorite may according to the invention be used in a suitable proportion to replace a hypochlorite and the chloride used together.

It follows from the above that the structure and the properties of the porous or cellular mass obtained by the method according to the invention, are considerably improved. The compressive and tensile strength is considerably increased, its ability of preservation is improved and its strength increases with time.

The products obtained according to this process are formed in a more greatly liquefied state and for this reason result in a much greater homogeneity as well as a uniform distribution of the cells throughout the mass to be obtained which is more particularly suitable for the manufacture of moulded products prepared in advance or on the working site.

It will be obvious that the present invention is in no way limited to the single chemical compounds mentioned nor to the proportions indicated above and these may be replaced or modified according to the requirements of theory or practice without on this account departing from the scope of the present invention.

What I claim is:

1. Method for producing materials of construction having a cellular structure in which lime base binders are combined with substances which evolve gas, comprising adding to the said binders an aqueous solution of ammonia and substances which evolve chlorine so as to produce, by the reaction between the ammonia and these substances, the evolution of nitrogen in the mass as it sets.

2. Method for producing materials of construction having a cellular structure in which lime base binders are combined with substances which evolve gas, comprising adding to said binders an aqueous solution of ammonia and at least one substance chosen from the group consisting of the hypochlorites of alkali and alkaline earth metals, so as to produce, by the reaction between the ammonia and the chlorine set free by the latter substance, the evolution of nitrogen in the mass as it sets.

3. Method for producing materials of construction having a cellular structure in which lime base binders are combined with substances which evolve gas, comprising, adding to said binders an aqueous solution of ammonia, chloride of lime, and sodium hypochlorite, so as to produce, by the reaction between the ammonia and the hypochlorite, the evolution of nitrogen in the mass as it sets.

4. Method for producing materials of construction having a cellular structure in which lime base binders are combined with substances that evolve gases, comprising, adding to said binders an aqueous solution of ammonia, chloride of lime, hypochlorite of sodium, and hydrogen peroxide in a quantity sufficient to produce the heat required for the reactions.

5. Method for producing materials of construction having a cellular structure in which lime base binders are combined with substances evolving gases, comprising, adding to the said binders an aqueous solution of ammonia, chloride of lime, hypochlorite of sodium and hydrogen peroxide in a quantity less than that of the aqueous solution of ammonia.

SIMON MISSOTTEN.